United States Patent [19]

Oman

[11] 4,324,985
[45] Apr. 13, 1982

[54] PORTABLE WIND TURBINE FOR CHARGING BATTERIES

[75] Inventor: Richard A. Oman, Huntington, N.Y.

[73] Assignee: Grumman Aerospace Corp., Bethpage, N.Y.

[21] Appl. No.: 167,170

[22] Filed: Jul. 9, 1980

[51] Int. Cl.³ .............................. F03D 7/04; F03D 1/04
[52] U.S. Cl. .......................................... 290/55; 415/3; 440/8
[58] Field of Search .................... 415/2 A, 3 A, 4 A; 440/8, 37; 60/694, 695; 290/55

[56] References Cited

U.S. PATENT DOCUMENTS

| | | | |
|---|---|---|---|
| 984,599 | 2/1911 | Pichault | 24/243 R |
| 1,181,988 | 5/1916 | Breitung | 440/8 |
| 1,465,602 | 8/1923 | Gentry | 415/2 |
| 1,677,745 | 7/1928 | Bonetto | 290/55 X |
| 1,876,595 | 9/1932 | Beldimano | 415/60 |
| 2,018,888 | 10/1935 | Francis | 415/2 |
| 2,055,012 | 9/1936 | Jacobs | 290/55 |
| 3,447,741 | 6/1969 | Havette et al. | 49/291 |
| 3,883,750 | 5/1975 | Uzzell | 290/55 |
| 4,021,135 | 5/1977 | Pedersen et al. | 72/470 |
| 4,073,516 | 2/1978 | Kling | 290/55 |
| 4,075,500 | 2/1978 | Oman et al. | 290/55 |

FOREIGN PATENT DOCUMENTS

| | | |
|---|---|---|
| 96382 | 3/1924 | Austria . |
| 743672 | 5/1943 | Fed. Rep. of Germany . |
| 883428 | 7/1949 | Fed. Rep. of Germany . |
| 975625 | 3/1942 | France . |
| 891697 | 3/1944 | France .............. 415/2 A |
| 2290585 | 4/1976 | France .............. 416/132 B |
| 2425002 | 3/1979 | France .............. 415/3 A |
| 249011 | 3/1926 | United Kingdom . |
| 489139 | 7/1938 | United Kingdom . |

Primary Examiner—J. D. Miller
Assistant Examiner—D. L. Rebsch
Attorney, Agent, or Firm—Morgan, Finnegan, Pine, Foley and Lee

[57] ABSTRACT

In a wind turbine assembly incorporating a diffuser, the diffuser includes an articulated duct formed of a set of members, such as the sectors of a conic section, which are pivotable about axes in a plane normal to the turbine axis. To permit an enlargement or contraction of the articulated duct, the members are joined by flexible gussets or, alternatively, are configured for overlapping. Springs offset from the pivoting axes are attached to the members to provide a bistable attitude thereto. In response to high winds, the spring forces are overcome by the wind forces on the articulated duct to allow the members to pivot inwardly reducing the effective wind capture area of the diffuser. The diffuser is further fabricated with slots between sections of duct to enlarge the effective area swept by the turbine blades for increased power availability from the turbine.

26 Claims, 10 Drawing Figures

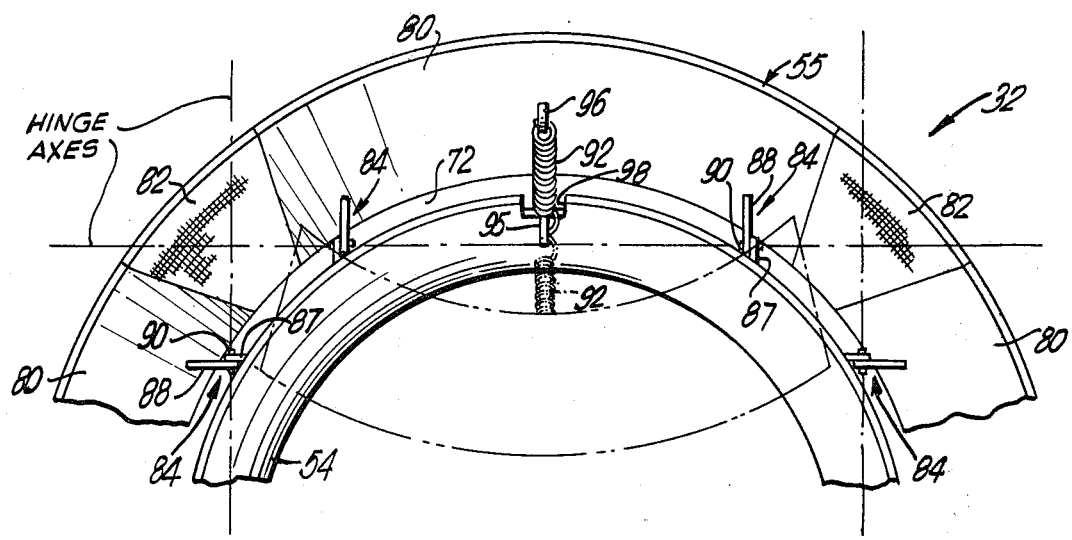
FIG.4
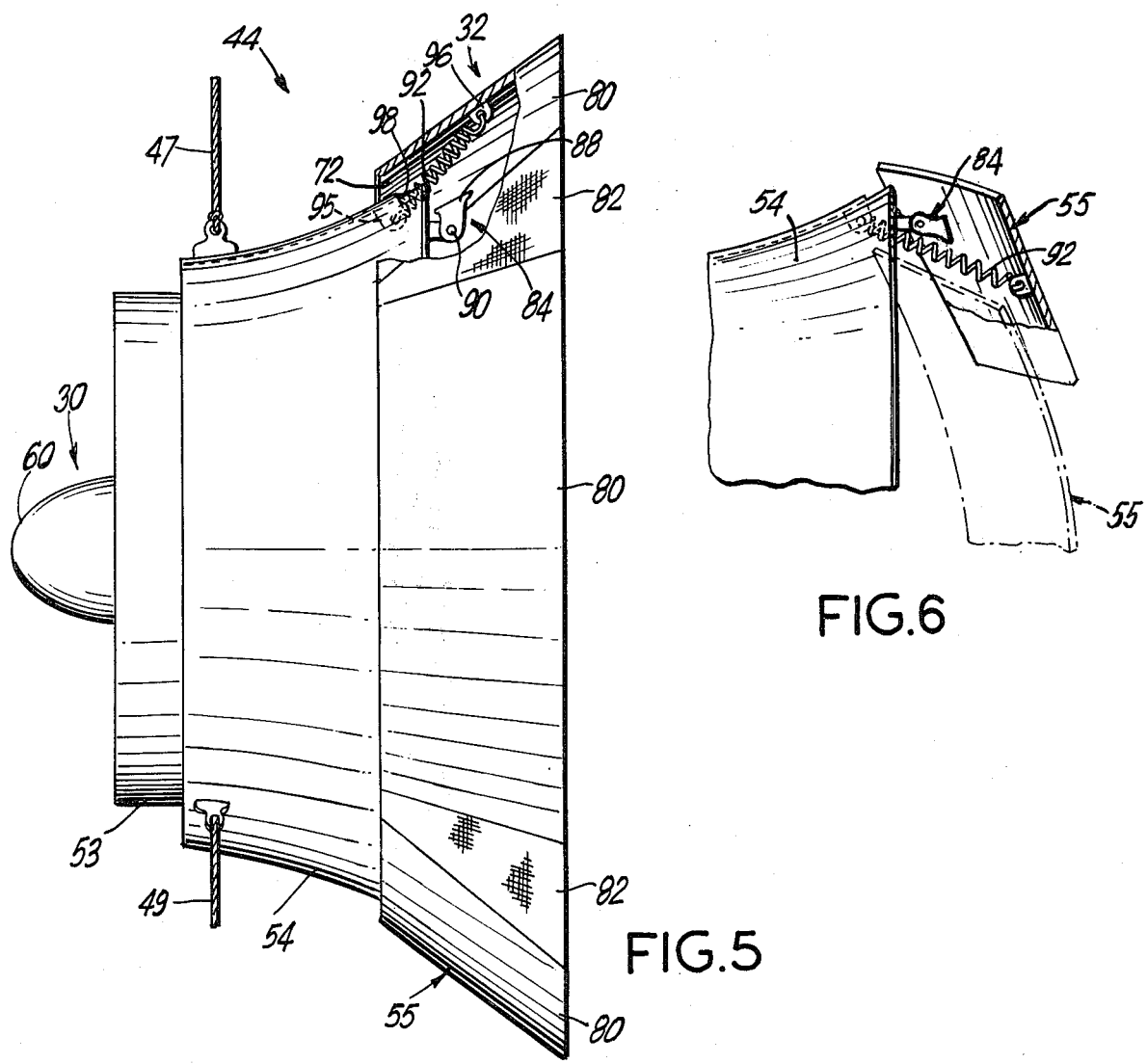
FIG.6
FIG.5

PORTABLE WIND TURBINE FOR CHARGING BATTERIES

BACKGROUND OF THE INVENTION

This invention relates to a wind turbine augmented by a diffuser for driving a generator of electricity and, more particularly, to such a turbine wherein an element of the diffuser can be folded to reduce the size of the diffuser, and to limit charging by the generator under very high wind conditions.

A turbine converts the power of a moving fluid, such as the moving air in wind, to mechanical power in the rotating shaft of the turbine. As is well known, turbines are constructed with differing physical structures to produce a large or a small fluid pressure differential between the inlet and the outlet ports of the turbine. In a wind turbine the foregoing pressure differential is small, the ratio of the fluid pressure at the inlet and outlet ports of the turbine being near unity. The output shaft of the turbine is connected to a load which utilizes the power extracted from the moving fluid.

As an example of a wind turbine connected to a load, U.S. Pat. No. 4,075,500 which issued in the name of Oman et al on Feb. 21, 1978 shows a turbine having an electric generator. Historically, an early use for a wind turbine is the driving of mills, such as flour mills sawmills, or fulling mills; such well known and referred to as a windmill.

As seen in the aforementioned Oman patent, a turbine may be augmented by a diffuser. The diffuser is a duct or set of ducts that produces a deceleration of the moving fluid, such as the moving air, with a resultant increase in the fluid pressure. The combination of a diffuser with the turbine increases the effectiveness of the turbine by allowing it to extract more power from the air incident upon the turbine than would be obtained in the absence of the diffuser. For subsonic fluid flow, as obviously occurs in the case of a wind turbine, the diffuser takes the form of a diverging duct.

An electric generator, driven by a wind turbine serves as a source of electric power which may be utilized at remote sites where electric power may not normally be available. For example, in a sailboat moored, anchored or at a dock between usage periods, such a turbine driven generator may be deployed for recharging the batteries which power the radios, pumps, lights, and other electrical devices aboard the sailboat. Even though the turbine blades of such a portable turbine driven generator may well be substantially smaller than the turbine blades utilized in a fixed installation capable of a comparable power output, the augmentation of the diffuser provides a sufficient increase in the conversion from wind power to electric power to provide great utility to such a portable unit.

A problem arises in that the physical size of the diffuser, at its maximum diameter, is substantially larger than the turbine rotor with the result that the size of the diffuser limits the power output of a turbine constrained by the space available for storage. An additional problem inherent to all wind turbine must also be considered in the use of a diffuser. The problem occurs in the presence of excessively high winds wherein the high energy flow in the air is converted by the diffuser to still higher energy flow to the blades of the turbine. An electric generator driven by the turbine would then produce excessively high current resulting in a possible burn-out of the generator.

SUMMARY OF THE INVENTION

The foregoing problems are overcome and other advantages are provided by a diffuser-augmented wind turbine for driving a load such as an electric generator. The diffuser is preferably constructed in the form of a series of coaxial ducts which enclose the turbine rotor, the duct assembly flaring radially outward as it approaches the outlet port of the diffuser at the rear of the assembly. In order to obtain a relatively large amount of power from a relatively small portable wind turbine, the ducts are arranged symmetrically about the turbine axis to provide slots between the ducts through which air can flow. The effect of the air flow in the slots is an enlargement of the effective area swept by the turbine blades with a marked increase in the available power.

In accordance with the invention, a flared element of the diffuser, namely, a flared outer duct of the aforementioned series of ducts, is articulated for deforming in response to excess wind pressure or to a manual folding operation. The deformation is an inward folding of individual sectors of the flared outer duct. The inward folding of the outer duct impedes the internal flow of air through the diffuser and thereby reduces the air flow through the turbine blades. The folding thereby prevents the possible burn-out of a generator driven by the turbine. In addition, the configuration of the folded outer duct substantially reduces the outer diameter of the diffuser to facilitate stowage of the diffuser-augmented turbine.

The articulation of the flared element of the diffuser is accomplished by forming the flared element of a set of relatively rigid sectors which are joined together by flexible gussets. The gussets fold to allow the individual sectors to rotate inwardly and sequentially about their individual hinge axes. In one embodiment of the invention, the folding is accomplished by pivoting the sectors about transverse axes which are perpendicular to planes parallel to the longitudinal axis of the turbine. In a second embodiment of the invention, the sectors are folded about rays extending outwardly from the central axis of the rotor for folding in the manner of a fan. The individual sectors of the articulated diffuser element are preferably formed of a lightweight material such as aluminum. The gussets may be formed of cloth or fabric such as rubber, or other stretchable fabric such as that manufactured under the trade names of Spandex or Lycra.

With respect to the pivoting of the sectors of the articulated diffuser element about the transverse axes, a feature of the invention is found in the attachment of pivots between the sectors and an inner duct of the diffuser, and wherein the pivoting is accomplished with the aid of springs connecting individual ones of the sectors to the inner duct. As each sector pivots about its transverse axis, the aft end of the spring, connected to the sector, is displaced radially. The displacement of the aft end of the spring in the radial direction brings the spring alternately above or below the axis of the pivot resulting in a bistable configuration for the articulated diffuser element. In the deployed state, the outer circumference of the articulated element is enlarged until the gussets become taught and, similarly, upon the folding of the articulated element, the trailing edge of the articulated element decreases in circumference until the gussets become taut. As a result, the articulation is accomplished with a snap action in which the diffuser element is snapped to its deployed state or snapped to its folded state.

To accomplish the foregoing pivoting, a hinge element is mounted near each end of an individual sector with the hinge elements of each sector being oriented on a common axis of pivoting. The pivots are mounted on the inner surface of each sector of the outer duct and also are secured to the inner duct of the diffuser. Thereby, during a pivoting motion of a sector of the diffuser, the central portion of the leading edge of the sector follows the movement of the trailing edge of the sector to move radially inward for folding and to move radially outward for deployment. The greatest amount of displacement is experienced by the trailing edge of a sector with the result that the gussets joining the sectors become taut at either an outer or inner extreme position of the deflection. In view of the outward flaring of each of the sectors, the sectors are able to catch the wind and, in response to a predetermined excessive wind speed, overcome the restraining force of the springs and snap to the folded position automatically. The predetermined wind speed at which folding occurs is dependent on the stiffness of the aforementioned springs and may be selected by choice of spring constant. The snapping to either position may also be readily accomplished manually.

BRIEF DESCRIPTION OF THE DRAWINGS

The aforementioned features and other aspects of the invention are explained in the following description taken in connection with the accompanying drawings where:

FIG. 4 is an enlarged rear view of a portion of the diffuser taken along the line 4—4 in FIG. 3;

FIG. 5 is a side view of the turbine, generator and diffuser assembly taken in the direction of a hinge axis of FIG. 4, a portion of the diffuser being deleted to show the attitudes of a hinge and a spring supporting a sector of the diffuser in the deployed state;

FIG. 6 is a diagrammatic view of the assembly of FIG. 5 showing a portion of the diffuser in the stowed state;

DESCRIPTION OF THE PREFERRED EMBODIMENT

Figure 1:
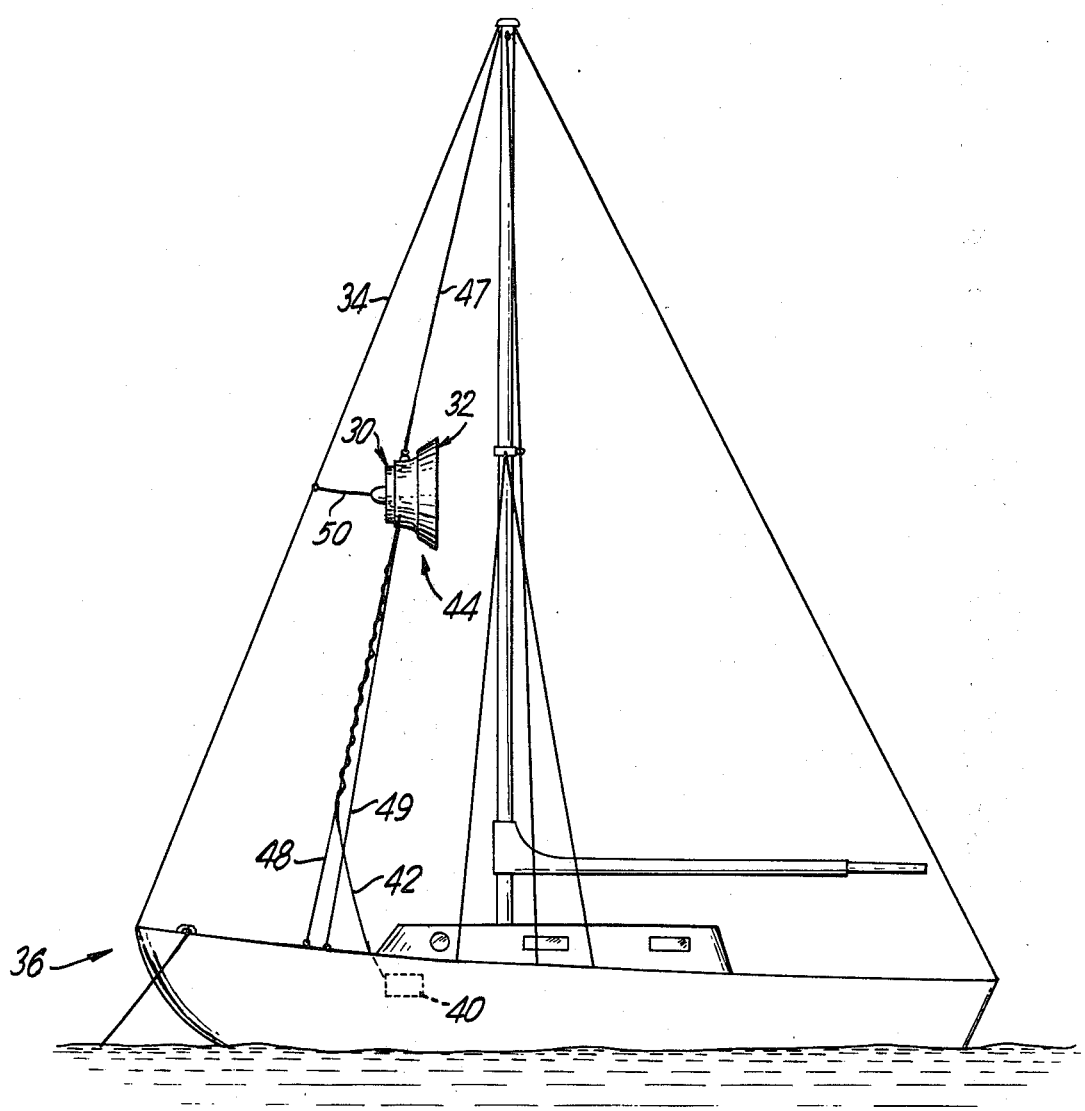
FIG. 1 is a stylized view of a sailboat having a turbine driven electric driven electric generator suspended in the rigging, the turbine being seen elevational view and being enclosed by an articulated diffuser in accordance with the invention.

Referring now to FIG. 1, a wind turbine 30 having an articulated diffuser 32 in accordance with the invention is supported in the rigging 34 of a sailboat 36. A generator 38 of electricity, seen in FIG. 3 but hidden in FIG. 1 behind the diffuser 32, is driven by the turbine 30. The generator 38 is coupled to a battery 40, shown in phantom as it is located below decks, by electric wires 42 for charging the battery 40. The assembly 44 of the turbine 30 and the generator 38 is of sufficiently small size and weight to be readily portable and to be utilized for the generation of electricity in remote locations as is exemplified by the suspension of the assembly 44 in the rigging 34 of the sailboat 36. For example, the diffuser 32 may be constructed with an outer diameter of approximately 30 inches in the deployed state and a diameter of approximately 15 inches in the stowed state. The turbine is safely used even in the presence of children by the mounting of the turbine 30 in the rigging 34 above the reach of children. In the event that the turbine is to be mounted at the level of the deck of the boat 36, a screen, not shown in the drawings, may be placed in the inlet port of the turbine 30 and in the outlet port thereof to prevent the children from placing their hands near the blades of the turbine 30.

The use of the turbine 30 is substantially less costly than the use of solar cells as a source of electric power in remote locations. The turbine 30 may be used wherever wind is plentiful. In addition to the aforementioned use in the sailboat, the turbine 30 may also be advantageously employed for the generation of electric power at remote cabins, campsites, and stations for the performance of scientific experiments.

Figure 2:
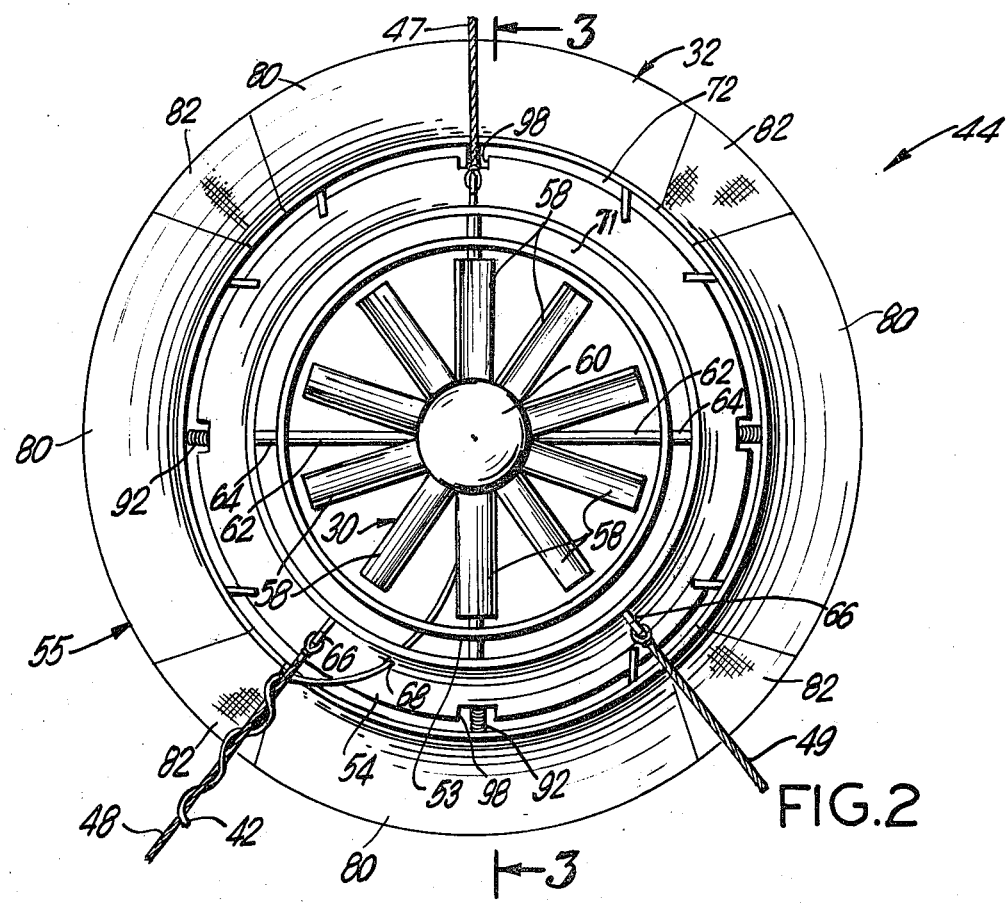
FIG. 2 is a front view of the turbine and diffuser of FIG. 1.
Figure 3:
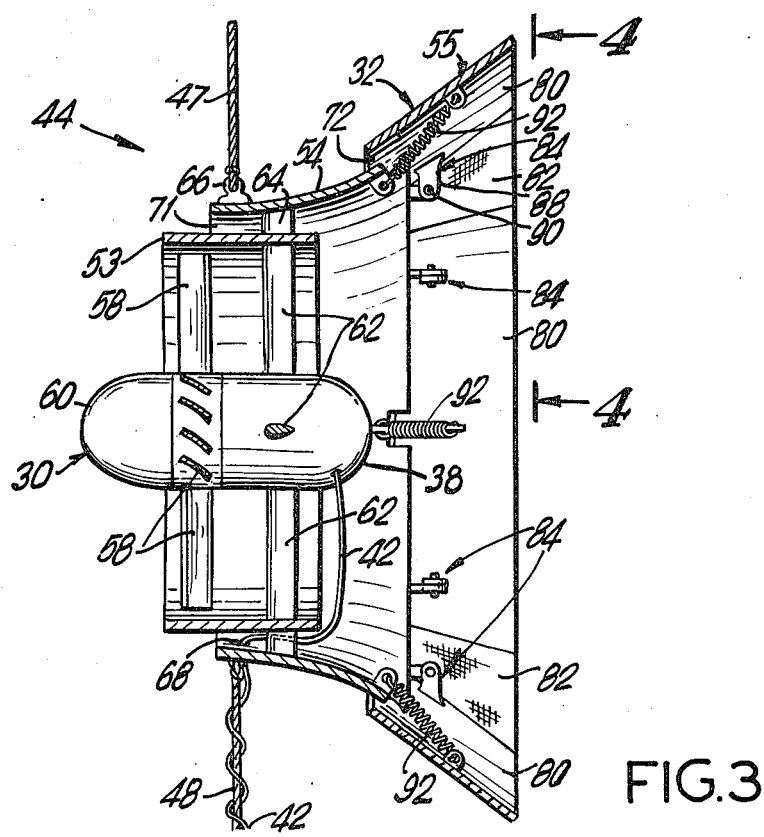
FIG. 3 is a sectional view of the assembly of turbine, generator and diffuser taken along the line 3—3 in FIG. 2.

Referring also to FIGS. 2-3, the assembly 44 of the turbine 30 and the generator 38 is conveniently suspended by three cables 47, 48 and 49 attached to the assembly 44 ahead of its aerodynamic center so that the turbine 30 will face into the wind by pivoting about the cables 47-49. The upper cable 47 connects with the rigging 34 and supports the weight of the assembly 44 while the two lower cables 48-49 connect with the hull of the boat 36 to steady the turbine 30. The lower cables 48-49 are spread apart by an angle of approximately 30 degrees to 60 degrees, 40 degrees being preferred, to permit the turbine 30 to pivot into the wind while providing a torque for returning the turbine 30 to its initial orientation as the wind dies down. If desired, an additional chord 50 may be attached between the assembly 44 and the forestay of the boat 36 to further stabilize the turbine 30.

The diffuser 32 is constructed of three ducts, an inner duct 53 or shroud having a cylindrical shape, a middle duct 54 having a surface which is substantially a section of a hyperboloid of revolution about the central axis of the turbine 30, and an outer duct 55 which is a section of a cone. Blades 58 of the turbine 30 are located behind a fairing 60 in a circular array about the axis of the turbine 30 and within the duct 53. The leading edge of the duct 53 serves as an inlet port to the turbine 30 while the trailing edge of the duct 55 serves as the outlet port to the turbine 30. As seen in FIG. 3, the generator 38 is mounted coaxial to and behind the turbine 30. The inner duct 53 is supported relative to the turbine 30 and the generator 38 by struts 62 connecting between the duct 53 and the generator 38. Similarly, the duct 54 is secured to the duct 55 by struts 64. The struts 62 and 64 are advantageously provided with a streamlined cross-sectional form to ensure a smooth flow of air through the diffuser 32. Eyelets 66 extend from the outer surface of the duct 54 for attaching the cable 47-49 to the assembly 44, the eylets 66 being positioned at the leading edge of the duct 54 to provide for the aforementioned suspension of the assembly 44 forward of its aerodynamic center. The electric wires 42 which are coupled to the generator 38 are seen to pass through an aperture 68 in the duct 54, and are then wound around the cable 48 to be brought to the battery 40 of FIG. 1.

The ducts 53–54 and the blades 58 may be fabricated of metal sheet or moled of a light weight plastic material such as polyethylene or polyvinyl-chloride. In the event that the plastic material is utilized, in which case the eyelets 66 are electrically insulated from each other, the cables 47–49 may be fabricated of an electrically conducting metal and used as electrical conductors for conducting electricity from the generator 38 to the battery 40. Thus, one of the two wires 42 would be connected to the cable 48 while the other one of the wires 42 would be connected to either the cable 47 or the cable 49.

The ducts 53–55 are spaced apart in the radial direction to provide slots 71–72 through which air enters from outside of the diffuser 32 to the interior thereof, this air flow in addition to the air flow through the inlet port enabling the diffuser 32 to provide an effective area to the operation of the turbine 30 which is larger than the area of the turbine disk, namely the area swept by the blades 58. This produces a greater power output capability to the turbine 30 than would otherwise be attainable. The area of the exit port is approximately three times that of the turbine disk. The overall length of the diffuser 32, from its inlet port to its outlet port, is approximately 45% of the diameter of the inlet port. The diameter of the exit port would be typically in the range of twenty to thirty inches.

In accordance with the invention, the articulation of the diffuser 32 is accomplished by fabricating the outer duct 55 of rigid sectors 80 joined by flexible gussets 82, the sectors 80 being secured to the middle duct 54 by pivots 84 about which the duct 55 folds inwardly in response to excessive wind speed. As an example in the construction of the duct 55, the sectors 80 are formed of a light weight metal, such as aluminum, and the gussets 82 are formed of cloth or fabric such as rubber or a stretchable woven material a suitable material being marketed commercially under the name of Spandex or Lycra.

With reference also to FIG. 4, the pivoting of the sectors 80 is more readily seen. Each pivot 84 comprises a forward arm 87 and a trailing arm 88 which are joined by a pin 90. The arms 87 of the respective pivots 84 are joined to the middle duct 54 on its interior surface adjacent the trailing edge thereof. The arms 88 are similarly joined to the interior surface of the sectors 80 of the outer duct 55 adjacent its leading edge. Two pivots 84 are utilized with each sector 80, the pivots 84 being located at opposite ends of the sector 80 with their respective pins 90 being oriented coaxially about a common axis of pivot. The sectors 80 are of equal size and are positioned uniformly about the turbine axis with the pivoting axes forming a regular polygon. While the duct 55 has been divided into four sectors in the preferred embodiment of the invention, it is to be understood that a larger number of sectors may be employed.

Springs 92 hold the sectors 80 erect in the deployed state, or folded inwardly in the stowed state. The springs 92 are connected from the middle duct 54, respectively, to each of the sectors 80, one spring 92 being connected to a sector 80 at a point midway between the two pivots 84 of the sector 80. Each spring 92 terminates in an inner pedestal 95 and an outer pedestal 96 by which it is secured respectively to the inner surface of the duct 54 and the inner surface of the corresponding sector 80. In order to provide clearance for the springs 92 past the trailing edge of the middle duct 54 in the deployed state of the diffuser 32, slots 98 are provided in the trailing edge of the duct 54 behind the respective pedestals 95. Each spring 92 is disposed outwardly of its corresponding pivot axis during the deployed state of the diffuser 32, and is disposed inwardly of the pivot axis during the stowed state of the diffuser 32. The foregoing alternative dispositions of the springs 92 may more readily be seen by a sighting along a pivot axis as is presented in FIGS. 5–6.

Referring also to FIGS. 5–6 wherein the views are taken along a pivot axis of FIG. 4, a spring 92 is seen to pass through a slot 98 and above (radially outward of) a pivot 84 during the deployed state of FIG. 5, and to pass below the pivot 84 during the stowed state of FIG. 6. A restraining force to the spring 92 in each of the states is provided by tension in the gussets 82. The tension occurs in the deployed state by virtue of the spreading circumference of the duct 55. The tension occurs in the stowed state by the opposed movements of the sides of the gussets 82 brought on by the overlapping movement of the sides of the sectors 80 as depicted in FIG. 6 wherein one sector 80 is shown in solid lines and a second sector 80 is shown in phantom view. Each gusset 82 is provided with a trapezoidal shape, the shorter of the two parallel sides being towards the leading edge of the outer duct 55 to accommodate the folding of the duct 55, and to provide for conical shape of the duct 55 in its deployed state.

Figure 7:
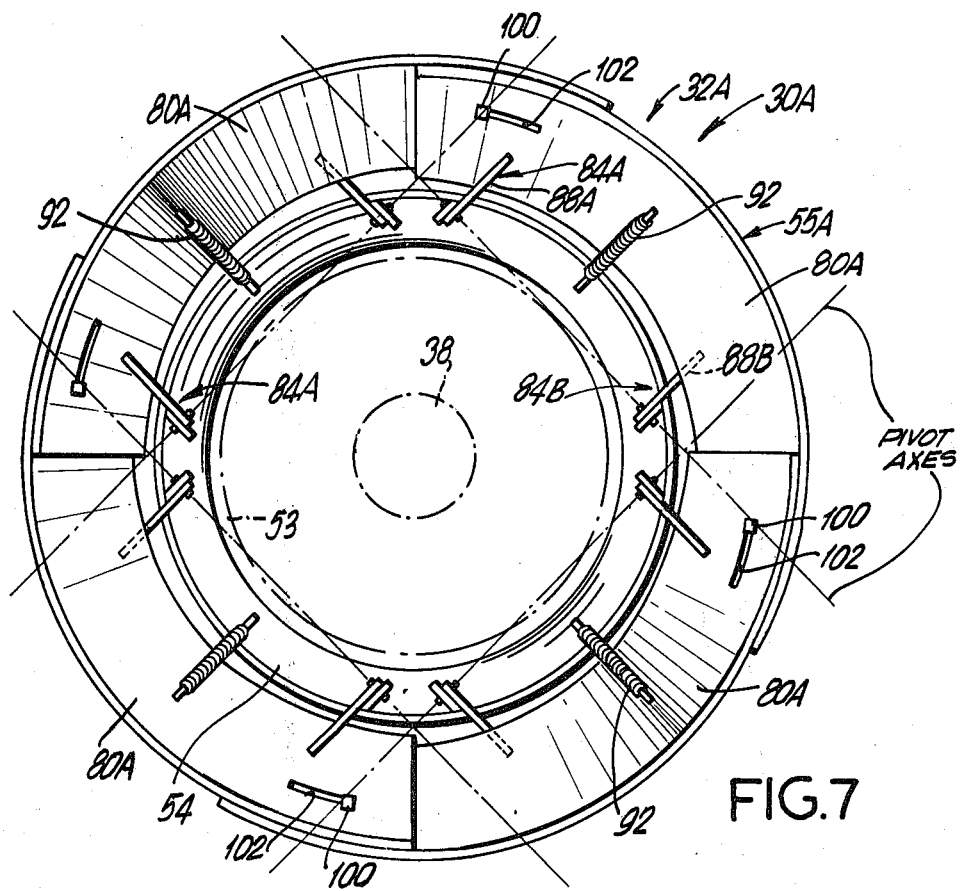
FIG. 7 is a stylized view of an alternative embodiment of the diffuser wherein the sectors of the diffuser overlap in the manner of a fan to permit a spreading and contraction of the sectors for deployment and stowage of the diffuser.

Referring now to FIG. 7, there is seen a rear view of a wind turbine 30A including a diffuser 32A which is an alternative embodiment of the articulated diffuser 32 described in FIGS. 2–6. To facilitate a description of this embodiment of the invention, the generator 38 and the inner duct 53 are shown in phantom. The middle duct 54, and the springs 92 are the same as described previously with respect to the diffuser 32.

The outer duct 55A of the diffuser 32A is formed of sectors 80A which are sufficiently large to provide an overlapping of neighboring sectors 80A. The pivots 84A–B which support the sectors 80A upon the middle duct 54 are essentially the same as the pivots 84 previously described with respect to the diffuser 32 except that the pivots 84A and 84B connect with opposite sides of the sectors 80A which they support. Thus, each sector 80A is supported by two pivots, a pivot 84A and a pivot 84B, with the pivot 84A contacting the interior surface of the sector 80A while the pivot 84B contacts the outer surface of the sector 80A. The positioning of the trailing arms 88A and 88B on opposite sides of each sector 80A provides space for the overlapping portions of the sectors 80A. Also, by way of illustrating an alternative mounting of the pivots, the leading arms of the pivots 84A–B are shown secured to the inner surface of the middle duct 54.

In operation, the sectors of the diffuser 32A are pulled radially outward for deployment, and radially inward for stowage, in a manner analogous to the deployment and stowage of the diffuser 32. However, in the case of the diffuser 32A, the sectors 80A slide over the neighboring sectors 80A in the manner of a fan which opens and closes, while in the case of the diffuser 32, the spreading apart and contraction of the array of sectors 80 is accomplished by the gussets 82. Also, in the diffuser 32A, a tooth 100 is provided at one end of a sector 80A for sliding in a slotted track 102 located in the opposite end of a neighboring sector 80A, the length of the track providing a limitation on the extent of the deployment and stowage as was accomplished previously by the gussets 82 of the diffuser 32.

Figure 8:
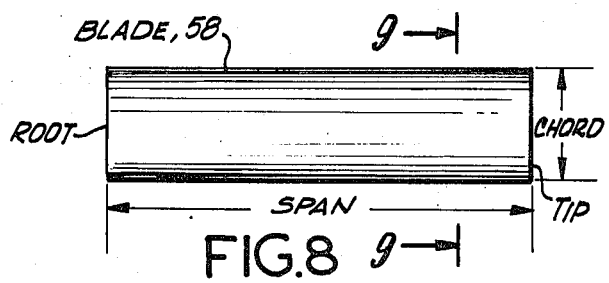
FIGS. 8 and 9 are respectively, plan and end views of a blade of the turbine of FIG. 2, the view of FIG. 9 being taken along the line 9—9 in FIG. 8.
Figure 9:
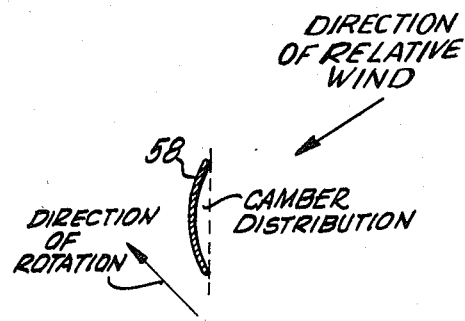
Figure 10:
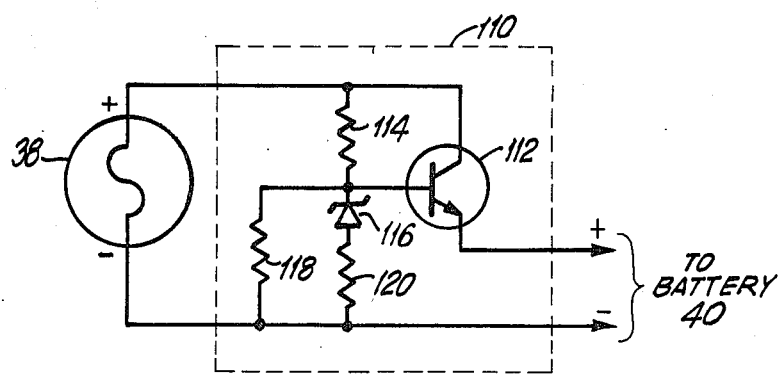
FIG. 10 is a schematic diagram of a electrical circuit for use with the generator of FIG. 3 in the charging of a battery.

Further details of the construction are shown in FIGS. 8–10. With reference to FIGS. 8–9, the blades 58 of the turbine 30 are formed of sheet metal and have a constant chord, constant section thin airfoil. The sheet metal is conveniently shaped to form a blade 58 by bending on a brake or by use of a press block to provide a desired camber and twist, an exemplary camber being seen in FIG. 9.

FIG. 10 shows an exemplary circuit 110 connected between the generator 38 and the battery 40 to limit the voltage applied to the battery 40 by the generator 38. The generator 38 includes a permanent magnet and commutator (not shown) for providing a direct current, the current passing through a transistor 112 for charging the battery 40. The collector terminal of the transistor 112 connects with the position terminal of the generator 38 while the emitter terminal connects with the positive terminal of the battery 40. The base terminal connects with a well-known voltage reference circuit comprising a resistor 114 and a zener diode 116. The negative terminal of the generator 38 connects with the negative terminal of the battery 40. A bypass resistor 118 and a series resistor 120 are connected in a series parallel arrangement with the diode 116 for protecting the diode 116 from excessive currents. Assuming, by way of example, that the generator 38 provides a charging current of five amperes to a twelve-volt lead-acid battery, the transistor 114 is preferably rated at ten amperes and the zener voltage is approximately 14 volts.

It is to be understood that the above-described embodiments of the invention are illustrative only and that modifications thereof may occur to those skilled in the art. Accordingly, the invention is not to be regarded as limited to the embodiments disclosed herein, but is to be limited only as defined by the appended claims.

What is claimed is:

1. A wind turbine having a diffuser comprising a plurality of coaxial ducts for allowing high pressure air to enter said diffuser, said ducts being disposed about a common axis and spaced apart radially from said axis, one said ducts being articulated relative to a second of said ducts, said one duct being circumferentially continuous; and means for directing a force between said one duct and said second duct, the direction of said force passing through an axis of articulation during an articulation between said first and said second ducts to provide a bistable arrangement of said ducts.

2. A turbine according to claim 1 wherein said one duct comprises a set of rigid members joined together by flexible members which are interleaved with said rigid members in a circumferential direction about said axis.

3. A turbine according to claim 1 wherein:
said one duct comprises a set of rigid members joined together by flexible members; and
said rigid members are sectors of a surface enclosing a central axis, said diffuser comprising means for pivoting said sectors about axes in a plane normal to said central axis.

4. A wind turbine having a diffuser comprising a plurality of coaxial ducts disposed about a common axis and spaced apart radially from said axis, one of said ducts being articulated relative to a second of said ducts; said one duct comprising a set of rigid members joined together by flexible members;
said rigid members being sectors of a surface enclosing a central axis, said diffuser further comprising means for pivoting said sectors about axes in a plane normal to said central axis; and wherein
said diffuser further comprises spring means, said second duct supporting said pivoting means, said spring means extending from said second duct to individual ones of said sectors for holding sectors in position.

5. A wind turbine having an articulated diffuser comprising:
a set of rigid members joined together by flexible members, said rigid members being sectors of a surface enclosing a central axis;
means for pivoting said sectors about axes in a plane normal to said central axis;
spring means;
a duct enclosing said central axis and supporting said pivoting means; and wherein
said spring means extends from said duct to individual ones of said sectors for holding said sectors in position, and a spring of said spring means passes through an axis of said pivoting during a pivoting of one of said sectors to provide a bistable arrangement of said sectors.

6. A wind turbine having a diffuser comprising a plurality of coaxial ducts disposed about a common axis and spaced apart radially from said axis, one of said ducts being articulated relative to a second of said ducts; and wherein
said one duct comprises a set of rigid members arranged about said common axis with each of said members slidably overlapping its neighboring members in a circumferential direction about said axis;
said diffuser further comprising means for pivoting said members about axes in a plane normal to said common axis; and wherein said diffuser further comprises spring means, said second duct supporting said pivoting means, said spring means extended from said second duct to individual ones of said rigid members for holding said rigid members in position.

7. A wind turbine having an articulated diffuser comprising:
a set of rigid members arranged about a central axis with each of said members slidably overlapping its neighboring members;
means for pivoting said members about axes in a plane normal to said central axis;
springs means;
a duct enclosing said central axis and supporting said pivoting means; and wherein
said spring means extends from said duct to individual ones of said members for holding said members in position, a spring of said spring means passing through an axis of said pivoting during a pivoting of one of said members to provide a bistable arrangement of said members.

8. A turbine assembly comprising:
a wind turbine;
a generator coupled to said turbine;
a diffuser circumscribing said turbine, said diffuser comprising a plurality of coaxial ducts of progressively larger diamter for allowing the flow of high pressure air into said diffuser; one of said ducts being articulated and circumferential continuous, said articulated duct comprising a plurality of sectors mechanically coupled for a variation of displacement relative to each other in a circumferentially direction about a common axis of said ducts; and means for directing a force between said articulated duct and a second of said plurality of coaxial ducts, the direction of said force passing through an axis of articulation during an articulation between said articulated duct and said second duct to provide a bistable arrangement of said ducts.

9. A turbine assembly comprising:
a wind turbine;
a generator coupled to said turbine;
a diffuser circumscribing said turbine, said diffuser comprising a plurality of coaxial ducts of progressively larger diameter, one of said ducts being articulated;
deployment means coupled to said articulated duct for alternatively opening said articulated duct to a deployed stated and closing said articulated duct to a stowed state; and
means for directing a force between said articulated duct and a second of said plurality of coaxial ducts, the direction of said force passing through an axis of articulation during an articulation between said articulated duct and said second duct to provide a bistable arrangement of said ducts.

10. A turbine assembly according to claim 9 wherein said articulated duct includes means for limiting the magnitude of the circumference of said articulated duct during an opening thereof by said deployment means.

11. A turbine generator comprising:
a generator;
a wind turbine coupled thereto for driving said generator;
a diffuser assembly enclosing blades of said turbine, said diffuser assembly including first and second ducts, said second duct having a larger cross section than said first duct, a space between said first and second ducts defining a slot for control of airflow past said blades;
said second duct being formed of an articulated structure permitting a deployment of said second duct in two different states of differing cross sectional areas for regulating the flow of air past said blades, said second duct comprising a plurality of sectors mechanically coupled for a variation in displacement relative to each other in a circumferential direction about said second duct, said second duct being circumferentially continuous; and
means for directing a force between said first duct and said second duct, the direction of said force passing through an axis of articulation during an articulation between said first duct and said second duct to provide a bistable arrangement for said ducts.

12. A turbine driven generator according to claim 11 wherein each of said ducts has a variation in its cross sectional area as a function of location along its axis, said function changing upon articulation of said second duct.

13. An articulated turbine assembly comprising:
a diffuser including first and second ducts for allowing high pressure air to enter said diffuser, said first and second ducts being disposed about a common axis and spaced apart radially from said axis;
said second duct being formed from a set of members mechanically coupled to each other and movable with respect to each other, said second duct being circumferentially continuous;
pivoting means coupling each of said members to said first duct; and
spring means coupled between said first duct and said members of said second duct for urging the members of said second duct into either of two stable states.

14. A turbine assembly according to claim 13 wherein said pivoting means includes a set of arms pivotably connected, said set of arms displacing said members of said second duct into one of two stable states, said displacement being relative to said first duct in a direction normal to said common axis circumscribed by said first duct.

15. A turbine assembly according to claim 14 wherein an end of said spring means is offset from an axis of said pivoting, said spring means crossing over said pivoting axis during said pivoting to provide a bistable attitude of said second duct.

16. A turbine assembly according to claim 15 wherein said second duct includes means responsive to the circumference thereof to limit a pivoting motion of the members thereof.

17. A turbine assembly according to claim 16 wherein said displacement of said members of said second duct relative to said first duct by said arms places said second duct in the path of a wind blowing on said displaced members facing into said wind to receive a wind force urging said members to pivot about said pivoting means.

18. A wind turbine assembly comprising:
a wind turbine suitable for driving an electric generator;
A diffuser for directing wind past blades of said turbine comprising a plurality of ducts for allowing high pressure air to enter said diffuser;
said diffuser including means for varying the wind force presented to said blades, said force varying means altering the cross sectional area of said diffuser in response to a speed of said wind, said force varying means being circumferentially continuous and comprising a set of duct members mechanically coupled for a variation in displacement relative to each other in circumferential direction of a longitudinal axis of said diffuser; and
spring means coupled to individual of said duct members for urging said duct members alternately into either one of two stable states, the direction of a force of said spring means passing through a neutral position of said varying means during a passage of said members from one of said stable states to the other of said stable states.

19. A turbine assembly according to claim 18 wherein said diffuser comprises a first duct and a second duct, and wherein said duct members of said varying means are located within said second duct with said members inclined relative to an axis thereof, said members being pivotably connected to said first duct for pivoting in response to a force of said wind.

20. A wind turbine assembly comprising:
a wind turbine suitable for driving an electric generator;
a diffuser for directing wind past blades of said turbine;

said diffuser including means for varying the wind force presented to said blades, said varying means altering the cross sectional are of said diffuser in response to a speed of said wind, said force varying means comprising a set of duct members mechanically coupled for a variation in displacement relative to each other in a circumferential direction about a longitudinal axis of said diffuser;

said diffuser further comprising a first duct and a second duct, said duct members of said varying means being located within said second duct and said members inclined relative to an axis thereof, said members being pivotably connected to said first duct for pivoting in response to a force of said wind; and wherein said members are positioned in seriatim circumferentially around a longitudinal axis of said diffuser, and said varying means includes flexible gussets coupled between said members, edges of said flexible gussets being placed in tension upon an outward movement of edges of said members during a pivoting of said members.

21. A wind turbine assembly comprising:

a wind turbine suitable for driving an electric generator;

a diffuser for directing wind past blades of said turbine, said diffuser comprising a first duct and means for varying the wind force presented to said blades; said varying means altering the cross sectional area of said diffuser in response to a speed of said wind, said varying means comprising a second duct with members thereof inclined relative to an axis thereof, said members being pivotably connected to said first duct for pivoting in response to a force of said wind, said varying means including flexible gussets coupled between said members, and wherein edges of said flexible gussets are placed in tension upon an outward movement of edges of said members during a pivoting of said members; and spring means connecting said members with said first duct, said spring means urging said members into a pivoting movement which tenses edges of said gussets, said spring means passing alternatively along opposite sides of an axis of said pivoting to provide two stable states to the attitudes of said members of said second duct.

22. A wind turbine assembly comprising:

a wind turbine suitable for driving an electric generator;

a diffuser for directing wind past blades of said turbine, said diffuser comprising a first duct and means for varying the wind force presented to said blades; said varying means altering the cross sectional area of said diffuser in response to a speed of said wind, said varying means comprising a second duct with members thereof inclined relative to an axis thereof, said members being pivotably connected to said first duct for pivoting in response to a force of said wind, said varying means including flexible gussets coupled between said members, and wherein edges of said flexible gussets are placed in tension upon an outward movement of edges of said members during a pivoting of said members; and wherein said second duct has the surface of a conic section, each of said members being sectors of said conic section.

23. A wind turbine assembly comprising:

a wind turbine suitable for driving an electric generator;

a diffuser for directing wind past blades of said turbine, said diffuser comprising a first duct and means for varying the wind force presented to said blades; said varying means altering the cross sectional area of said diffuser in response to a speed to said wind, said varying means comprising a second duct with members thereof inclined relative to an axis thereof, said members being pivotably connected to said first duct for pivoting in response to a force of said wind, said varying means including flexible gussets coupled between said members, and wherein edges of said flexible gussets are placed in tension upon an outward movement of edges of said members during a pivoting of said members; and wherein said first duct has the surface of a hyperboloid of revolution.

24. A wind turbine assembly comprising:

a wind turbine suitable for driving an electric generator;

a diffuser for directing wind past blades of said turbine, said diffuser comprising a first duct and means for varying the wind force presented to said blades; said varying means altering the cross sectional area of said diffuser in response to a speed of said wind, said varying means comprising a second duct with members thereof inclined relative to an axis thereof, said members being pivotably connected to said first duct for pivoting in response to a force of said wind, said varying means including flexible gussets coupled between said members, and wherein edges of said flexible gussets are placed in tension upon an outward movement of edges of said members during a pivoting of said members; and wherein the cross sectional area of the leading edge of said second duct is larger than the trailing edge of said first duct, both of said ducts being coaxially positioned to provide a slot therebetween to control the flow of wind past said turbine blades.

25. A wind turbine assembly comprising:

a wind turbine;

a set of ducts enclosing an axis of said turbine, said ducts being of progressively larger diameter to provide a plurality of slots therebetween to control the flow of wind past blades of said turbine, one of said ducts being articulated for varying the cross sectional area thereof to further control the flow of wind past said blades; and deployment means coupled to said articulated duct for alternatively opening said articulated duct to a deployed state upon a manual triggering of said opening, and closing said articulated duct to a stowed state, upon a tiggering by said wind.

26. A wind turbine assembly comprising:

a wind turbine;

a set of ducts enclosing an axis of said turbine, said ducts being of progressively larger diameter to provide a plurality of slots therebetween to control the flow of wind past blades of said turbine, one of said ducts being articulated for varying the cross sectional area thereof to further control the flow of wind past said blades; and wherein an innermost duct of said set has the surface of a cylinder, an outermost duct of said set has the surface of a section of a cone, and a further duct located between said innermost and said outermost ducts has the surface of a section of a hyperboloid of revolution.

* * * * *

UNITED STATES PATENT AND TRADEMARK OFFICE
CERTIFICATE OF CORRECTION

PATENT NO. : 4,324,985

DATED : April 13, 1982

INVENTOR(S) : Richard A. Oman

It is certified that error appears in the above—identified patent and that said Letters Patent is hereby corrected as shown below:

In Col. 9, line 3, "circumferential" should read -- circumferentially --; on line 7, "tially" should read -- tial --; on line 24, "stated" should read -- state --.

In Col. 10, line 38, "A" should read -- a --.

Signed and Sealed this

Fourteenth Day of September 1982

[SEAL]

Attest:

GERALD J. MOSSINGHOFF

Attesting Officer     Commissioner of Patents and Trademarks